United States Patent
Poeselt et al.

(10) Patent No.: US 12,391,805 B2
(45) Date of Patent: Aug. 19, 2025

(54) BLOCK COPOLYMERS

(71) Applicant: BASF SE, Ludwigshafen am Rhein (DE)

(72) Inventors: Elmar Poeselt, Lemfoerde (DE); Frank Thielbeer, Lemfoerde (DE); Lisa Marie Schmidt, Lemfoerde (DE); Theresa Huelsmann, Lemfoerde (DE); Peter Gutmann, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 704 days.

(21) Appl. No.: 17/597,865

(22) PCT Filed: Jul. 31, 2020

(86) PCT No.: PCT/EP2020/071676
§ 371 (c)(1),
(2) Date: Jan. 27, 2022

(87) PCT Pub. No.: WO2021/019076
PCT Pub. Date: Feb. 4, 2021

(65) Prior Publication Data
US 2022/0259382 A1 Aug. 18, 2022

(30) Foreign Application Priority Data
Jul. 31, 2019 (EP) .................................... 19189340

(51) Int. Cl.
| | | |
|---|---|---|
| C08G 81/00 | (2006.01) | |
| C08G 63/60 | (2006.01) | |
| C08G 63/664 | (2006.01) | |
| C08G 69/14 | (2006.01) | |
| C08G 69/44 | (2006.01) | |
| C08J 9/228 | (2006.01) | |
| C08G 101/00 | (2006.01) | |

(52) U.S. Cl.
CPC ............ *C08G 81/00* (2013.01); *C08G 63/60* (2013.01); *C08G 63/664* (2013.01); *C08G 69/14* (2013.01); *C08G 69/44* (2013.01); *C08J 9/228* (2013.01); *C08G 2101/00* (2013.01); *C08J 2333/04* (2013.01); *C08J 2387/00* (2013.01)

(58) Field of Classification Search
CPC .............................. C08G 81/00; C08G 63/668
See application file for complete search history.

(56) References Cited

U.S. PATENT DOCUMENTS

| | | |
|---|---|---|
| 3,663,653 A | 5/1972 | Frohlich et al. |
| 3,766,146 A | 10/1973 | Witsiepe |
| 3,891,604 A | 6/1975 | Wolfe, Jr. |
| 4,345,064 A | 8/1982 | Mumcu |
| 4,349,661 A | 9/1982 | Mumcu |
| 4,355,155 A | 10/1982 | Nelsen |
| 5,039,779 A | 8/1991 | Cherdron et al. |
| 5,955,565 A | 9/1999 | Morris et al. |
| 6,274,696 B1 | 8/2001 | Bonte et al. |
| 7,973,124 B2 | 7/2011 | Maruyama et al. |
| 8,481,652 B2 | 7/2013 | Jain et al. |
| 8,779,031 B2 | 7/2014 | Schachtely et al. |
| 9,150,724 B2 | 10/2015 | Van Den Heuvel et al. |
| 9,884,947 B2 | 2/2018 | Prissok et al. |
| 10,005,218 B2 | 6/2018 | Rudolph et al. |
| 10,392,488 B2 | 8/2019 | Däschlein et al. |
| 11,142,625 B2 | 10/2021 | Gutmann et al. |
| 2001/0009662 A1 | 7/2001 | Cohn et al. |
| 2006/0165987 A1* | 7/2006 | Hildgen ............... A61K 9/5192 428/402.2 |
| 2008/0207339 A1* | 8/2008 | Jauernig ............... F16C 21/005 700/95 |
| 2011/0213076 A1 | 9/2011 | Makal et al. |
| 2015/0273102 A1 | 10/2015 | Hissink et al. |
| 2017/0210167 A1* | 7/2017 | Itoh ........................ C08L 21/00 |
| 2019/0382546 A1 | 12/2019 | Cocquet et al. |

FOREIGN PATENT DOCUMENTS

| | | | |
|---|---|---|---|
| DE | 2936976 | 4/1981 | |
| DE | 2936977 | 4/1981 | |
| DE | 3818209 | 11/1989 | |
| EP | 0659825 | 6/1995 | |
| EP | 2325249 | 5/2011 | |
| EP | 2212362 B1 * | 3/2013 | ......... C08G 18/5024 |

(Continued)

OTHER PUBLICATIONS

Machine translation of JP5251883 (no date).*
Product description of Huntsman XTJ-542 retrievable from https://www.ulprospector.com/en/na/Coatings/Detail/848/50744/XTJ-542?st=20&sl=431840720&crit=SW50ZXJuZXQgU2VhcmNoID4gSHVudHNtYW4gUGVyZm9ybWFuY2UgUHJvZHVjdHM%3d&ss=2 (no date).*
Product description of Huntsman XTJ-548 retrievable from https://www.ulprospector.com/en/na/Coatings/Detail/848/50745/XTJ-548?st=20&sl=431841024&crit=SW50ZXJuZXQgU2VhcmNoID4gSHVudHNtYW4gUGVyZm9ybWFuY2UgUHJvZHVjdHM%3d&ss=2 (no date).*

(Continued)

*Primary Examiner* — Marc S Zimmer
(74) *Attorney, Agent, or Firm* — Grüneberg and Myers PLLC

(57) ABSTRACT

A block copolymer contains at least a block (P1) and a block (P2). The block (P1) is obtained or obtainable by reaction of a triblock copolymer having the structure A-B-A', where block B is selected from polyethers or polyesters and blocks A and A' are identical or different, and at least one polymer (PM) selected from polyesters and polyethers. The block (P2) is selected from polyamides and polyesters. A process can be used for producing the inventive block copolymer, a shaped article can be made containing the inventive block copolymer, and the inventive block copolymer can be used for producing a shaped article.

21 Claims, No Drawings

(56) References Cited

FOREIGN PATENT DOCUMENTS

| | | |
|---|---|---|
| WO | 01/04174 | 1/2001 |
| WO | 2007/082838 | 7/2007 |
| WO | 2013/153190 | 10/2013 |
| WO | 2015/052265 | 4/2015 |
| WO | 2015/055811 | 4/2015 |
| WO | 2018/146426 | 8/2018 |

OTHER PUBLICATIONS

International Preliminary Report on Patentability issued Sep. 28, 2021 in PCT/EP2020/071676, with English Translation mailed Feb. 3, 2022.
International Search Report dated Oct. 20, 2020 in PCT/EP2020/071676, with English translation, 5 pages.
"Kunststoffhandbuch" [Plastics handbook], vol. 7, "Polyurethane" [Polyurethanes], Carl Hanser Verlag, 3rd edition 1993, chapter 3.
Written Opinion dated Oct. 20, 2020 in PCT/EP2020/071676, with English translation, 9 pages.
Yi et al., "Synthesis and characteristics of thermoplastic elastomer based on polyamide-6", Society of Chemical Industry, vol. 60, 2011, pp. 1728-1736.

* cited by examiner

BLOCK COPOLYMERS

CROSS-REFERENCE TO RELATED APPLICATIONS

This application is the National Stage entry under § 371 of International Application No. PCT/EP2020/071676, filed on Jul. 31, 2020, and which claims the benefit of priority to European Application No. 19189340.3, filed on Jul. 31, 2019. The content of each of these applications is hereby incorporated by reference in its entirety.

BACKGROUND OF THE INVENTION

Field of the Invention

The present invention relates to a block copolymer at least comprising a block (P1) obtained or obtainable by reaction of a triblock copolymer having the structure A-B-A', where block B is selected from polyethers or polyesters and blocks A and A' are identical or different, and at least one polymer (PM) selected from the group consisting of polyesters and polyethers, and a block (P2) selected from the group consisting of polyamides and polyesters. The present invention further relates to a process for producing an inventive block copolymer, to a shaped article comprising an inventive block copolymer, and to the use of an inventive block copolymer for producing a shaped article.

A block copolymer is in the context of the invention understood as meaning a polymer composed of repeating blocks, for example of two repeating blocks.

Description of Related Art

Polymers based on polyamides or polyesters are employed in various fields. The properties of the polymer may be modified according to use. Thermoplastic elastomers are for example also described in the literature, for example in Jiri George Drobny, Handbook of Thermoplastic Elastomers, PDL Handbook Series, Elsevier, 2007, Geoffrey Holden, Hans R. Kricheldorf, Roderic P. Quirk, Thermoplastic Elastomers, Hansen Verlag, 2004, or Chunwang Yi, Zhihan Peng, Huaping Wang, Min Li, Chaosheng Wang, Synthesis and characteristics of thermoplastic elastomer based on polyamide—6, 2011, 60, 12, 1728-1736.

Block copolymers comprising polyamide blocks or polyester blocks are also known per se from the prior art and are employed in various fields. Thermoplastic polyamides are for example described in DE2936976, DE2936977, DE3818209A1, US2011213076 or U.S. Pat. No. 8,481,652. Thermoplastic polyesters are described in U.S. Pat. Nos. 4,355,155A, 3,766,146A, 3,891,604A, 6,274,696B1, 7,973,124B2, EP0659825A2, US9150724B2, WO2001004174A1, U.S. Pat. No. 3,663,653A, EP2325249A1, and U.S. Pat. No. 5,955,565A.

Block copolymers based on polyamides or polyesters typically have good mechanical properties and good resistance to thermal aging or aging due to UV. They also have good resistance to dynamic stress across wide temperature ranges.

Ether-based thermoplastic polyesters and thermoplastic polyamides stand out here on account of their resistance to hydrolysis and, in particular, low soft-phase Tg when using polytetrahydrofuran-based ether blocks.

Elastomers based on polytetrahydrofurans (also referred to as polytetramethylene oxides), in particular, exhibit melting of the soft phase, which can be detected for example through DSC measurements (heating rate 20 K/min) after predrying. Corresponding materials show a maximum within a range from −20 to 20° C. This thermal behavior adversely affects elastic properties in the corresponding temperature range.

SUMMARY OF THE INVENTION

It was accordingly an object of the present invention to provide block copolymers based on polyesters and polyamides that have good mechanical properties and good processability and also good dynamic properties in wide temperature ranges, in particular at low temperatures.

This object is achieved in accordance with the invention by a block copolymer at least comprising
  (i) a block (P1) obtained or obtainable by reacting
    (a) a triblock copolymer having the structure A-B-A', where block B is selected from polyethers or polyesters and blocks A and A' are identical or different, and
    (b) is at least one polymer (PM) selected from the group consisting of polyesters and polyethers,
  (ii) and a block (P2) selected from the group consisting of polyamides and polyesters.

It has surprisingly been found that the inventive combination of blocks (P1) and (P2) is able to achieve a higher temperature insensitivity in the polymer. This has advantages for all uses and also achieves higher elasticity and thus also higher resilience across wide temperature ranges, making it advantageous not only for compact, but also for foamed materials.

It has surprisingly been found that block copolymers of this type can be readily processed into shaped articles and also into a foamed pellet material that can in turn be readily processed further into shaped articles that in particular have very good rebound.

DETAILED DESCRIPTION OF THE INVENTION

According to the invention, the block copolymer has a block (P1) and a block (P2). Block (P2) is here selected from the group consisting of polyamides and polyesters. Block (P1) is obtained or obtainable by reaction of a triblock copolymer having the structure ABA', where block B is selected from polyethers or polyesters and blocks A and A' are identical or different, and at least one polymer (PM) selected from the group consisting of polyesters and polyethers.

The block copolymer of the invention may have further blocks, for example further polyester blocks, polyamide blocks or else further ether blocks. The polymers having polyamide blocks and polyether blocks may also contain randomly distributed units. The polyamide blocks may comprise homopolyamides or copolyamides.

In accordance with the invention, the production of block (P1) may employ a composition comprising the triblock copolymer ABA' and polymer (PM) selected from the group consisting of polyesters and polyethers, which also further compounds, in particular further polyethers or polyesters.

The triblock copolymer ABA' has according to the invention a block B selected from the group consisting of polyethers or polyesters as well as a block A and a block A'. Blocks A and A' may in accordance with the invention be identical or different and may differ both in their chemical nature and in the block length. Blocks A and A' may in accordance with the invention be selected from esters, polycaprolactones or ethers.

The structure of blocks B and A is in accordance with the invention preferably different to that of blocks B and A'. In one embodiment, B is for example selected from the group consisting of polyethers and A and A' are selected from the group consisting of polycaprolactones and polyesters. In a further embodiment, B is selected from the group consisting of polyesters, and A and A' are selected from the group consisting of polyethers.

The block copolymers of the invention are preferably elastomers, more preferably thermoplastic elastomers. The ratio of the blocks may in accordance with the invention vary within wide ranges. The block copolymer of the invention advantageously comprises 1 to 99% of block (P1) and 1 to 99% of block (P2), more preferably 5 to 95% of block (P1) and 5 to 95% of block (P2), in particular 15 to 85% of block (P1) and 15 to 85% of block (P2), more preferably 30 to 70% of block (P1) and 30 to 70% of block (P2).

The triblock copolymer comprises blocks B and A and A'. Block B is according to the invention selected from the group consisting of polyethers and polyesters. Suitable polyethers and polyesters are in principle known to those skilled in the art and described for example in "Kunststoffhandbuch" [Plastics handbook], volume 7, "Polyurethane" [Polyurethanes], Carl Hanser Verlag, 3rd edition 1993, chapter 3.1. The number-average molecular weight of the polyether polyols and polyester polyols used in accordance with the invention is preferably within a range from 500 to 5000 g/mol, for example within a range from 550 g/mol to 2000 g/mol, preferably within a range from 600 g/mol to 1500 g/mol, in particular between 650 g/mol and 1000 g/mol.

Preferred polyetherols are according to the invention polyethylene glycols, polypropylene glycols, and polytetramethylene oxides, in particular hydroxy-terminated polytetramethylene oxides, and also mixed polyetherols thereof. Also employable according to the invention are for example mixtures of different polytetramethylene oxides having different molecular weights.

When polytetramethylene oxides is used as block B, the number-average molecular weight Mn of the polytetramethylene oxide is preferably within a range from 500 to 5000 g/mol. More preferably, the number-average molecular weight Mn of the polytetramethylene oxide is within a range from 500 to 1400 g/mol.

Polytetramethylene oxides derived from both fossil and biological sources may in accordance with the invention be used.

Polyesters that have proven suitable are for example the polyalkylene terephthalates of alkanediols having 2 to 6 carbon atoms, in particular aromatic polyesters selected from the group consisting at polybutylene terephthalate (PBT), polyethylene terephthalate (PET), and polyethylene naphthalate (PEN), preference being given to using polyethylene terephthalate and particular preference to polybutylene terephthalate or mixtures of polyethylene terephthalate and polybutylene terephthalate.

The polyols used as block B preferably have an average functionality between 1.8 and 2.3, preferably between 1.9 and 2.2, in particular 2. The polyols used in accordance with the invention preferably have solely primary hydroxyl groups.

Preference is given to using as block B a polyether, polytetramethylene oxides being particularly advantageous.

Suitable polytetramethylene oxides or derivatives thereof are known per se to those skilled in the art. Preferred polyetherols are according to the invention polyethylene glycols, polypropylene glycols, and polytetramethylene oxides, and also mixed polyetherols thereof.

In a further embodiment, the present invention accordingly relates to a block copolymer as described above, wherein block B is selected from polytetramethylene oxides and polytrimethylene oxides.

In one embodiment of the present invention, B is selected from the group consisting of polyethers. The triblock copolymer is according to this embodiment accordingly a polyether having A and A' as end blocks. A and A' are according to this embodiment preferably selected from the group consisting of polycaprolactones and polyesters, for example from polyester blocks obtained from a dicarboxylic acid, for example adipic acid or sebacic acid, and a diol.

Suitable triblock copolyesters may be obtained for example by reaction of the free hydroxy groups in block B, especially of polytetramethylene oxide. Suitable triblock copolymers are for example poly-ε-caprolactone polyols, i.e. polyols obtained by reaction of ε-caprolactone and a polyether, for example a polytetramethylene oxide, as starter molecule.

Suitable poly-ε-caprolactone polyols are for example those having a number-average molecular weight within a range from 500 to 5000 g/mol, preferably within a range from 1000 to 5000 g/mol, more preferably within a range from 1500 to 2500 g/mol. Preference is given to using poly-ε-caprolactone diols, i.e. poly-ε-caprolactone polyols obtained or obtainable using a difunctional starter. Suitable starters are for example diols having a number-average molecular weight within a range from 50 to 1500 g/mol, preferably from 80 to 1500 g/mol, for example polyether polyols or polyester polyols. Polyether polyols are especially suitable.

In the context of the present invention, number-average molecular weights are unless otherwise stated obtained by determining the OH value. Suitable measurement conditions are known to those skilled in the art.

Suitable starter molecules are further selected from the group consisting of neopentyl glycol (NPG), butane-1,4-diol (BDO), hexane-1,6-diol (HDO) and long-chain polyether diols having a number-average molecular weight within a range from 500 to 1500 g/mol, preferably within a range from 800 to 1200 g/mol, further preferably 900 to 1100 g/mol.

Block B may in accordance with the invention additionally be selected from the group consisting of α-hydro-ω-hydroxypoly(oxytetramethylene)diols, polyethylene glycols, and polypropylene glycols, preferably from the group consisting of α-hydro-ω-hydroxypoly(oxytetramethylene) diols having a number-average molecular weight within a range from 150 to 1500 g/mol, polyethylene glycols having a number-average molecular weight within a range from 150 to 1500 g/mol, and polypropylene glycols having a number-average molecular weight within a range from 150 to 1500 g/mol.

In the context of the present invention, number-average molecular weights are unless otherwise stated obtained by determining the OH value. Suitable measurement conditions are known to those skilled in the art.

In accordance with the invention, block B may for example have a molecular weight Mn within a range from 100 to 1500 g/mol, preferably within a range from 200 to 1400 g/mol, more preferably within a range from 500 to 1300 g/mol, and blocks A and A' may each independently for example have a molecular weight Mn within a range from 200 to 1500 g/mol, preferably within a range from 300 to 1000 g/mol, more preferably within a range from 400 to 600 g/mol.

In a further embodiment, the present invention accordingly relates to a block copolymer as described above, wherein block A, or block A', or block A and block A' are selected from polycaprolactones.

In a further embodiment, the present invention also relates to a block copolymer as described above, wherein block B is selected from polyethers and block A, or block A', or block A and block A' are selected from polycaprolactones.

In a further embodiment, the present invention accordingly relates to a block copolymer as described above, wherein the triblock copolymer is a poly-ε-caprolactone polyol obtainable or obtained by reaction of ε-caprolactone and a starter molecule selected from the group consisting of α-hydro-ω-hydroxypoly(oxytetramethylene)diols.

In a further embodiment, the present invention relates to a block copolymer as described above, wherein the number-average molecular weight Mn of the triblock copolymer is within a range from 500 to 3500 g/mol, more preferably within a range from 500 to 3000 g/mol.

Block (P1) is according to the invention obtained or obtainable by reaction of a triblock copolymer having the structure ABA' and at least one polymer (PM) selected from the group consisting of polyesters and polyethers. Suitable as polymer (PM) are for example polyethers or polyesters having good miscibility with the triblock copolymer. In the context of the present invention, suitable as polymer (PM) are for example polyethers or polyesters that form with the triblock copolymer a composition that may be used for producing the block copolymers of the invention. The composition preferably shows no visible phase separation during premixing and under the reaction conditions.

Suitable polyethers and polyesters are in principle known to those skilled in the art and described for example in "Kunststoffhandbuch" [Plastics handbook], volume 7, "Polyurethane" [Polyurethanes], Carl Hanser Verlag, 3rd edition 1993, chapter 3.1. The number-average molecular weight of the polyether polyols and polyester polyols used in accordance with the invention is preferably within a range from 500 to 5000 g/mol, for example within a range from 1000 g/mol to 3500 g/mol, preferably within a range from 600 g/mol to 1500 g/mol, in particular between 1500 g/mol and 2500 g/mol.

Preferred polyetherols are according to the invention polyethylene glycols, polypropylene glycols, and polytetramethylene oxides, and also mixed polyetherols thereof. Also employable according to the invention are for example mixtures of different polytetramethylene oxides having different molecular weights.

When polytetramethylene oxides is used as polymer (PM), the number-average molecular weight Mn of the polytetramethylene oxide is preferably within a range from 500 to 5000 g/mol. The number-average molecular weight Mn of the polytetramethylene oxide is further preferably within a range from 1500 to 3500 g/mol, particularly preferably within a range from 1500 to 3000 g/mol.

The polytetramethylene oxides used as polymer (PM) may likewise derive from both fossil and biological sources.

Polyesters that have proven suitable are for example the polyalkylene terephthalates of alkanediols having 2 to 6 carbon atoms, in particular aromatic polyesters selected from the group consisting of polybutylene terephthalate (PBT), polyethylene terephthalate (PET), and polyethylene naphthalate (PEN), preference being given to using polyethylene terephthalate and particular preference to polybutylene terephthalate or mixtures of polyethylene terephthalate and polybutylene terephthalate. Also suitable in the context of the present invention are polyesters obtained from a dicarboxylic acid, for example adipic acid or sebacic acid, and a diol.

The polyols used as polymer (PM) preferably have an average functionality between 1.8 and 2.3, preferably between 1.9 and 2.2, in particular 2. The polyols used in accordance with the invention preferably have solely primary hydroxyl groups or amine groups.

The mixing ratio of the polymer (PM) and the triblock copolymer may in accordance with the invention vary within wide ranges.

Preference is in accordance with the invention given to using as polymer (PM) a polyol having a chemical structure resembling that of block B. When block B is selected from polyethers, the polymer (PM) used is preferably a polyether. When block B is selected from polyesters, the polymer (PM) is preferably selected from the group consisting of polyesters.

Preference is given to using as the polymer (PM) a polyether, polytetramethylene oxides being particularly advantageous. Suitable polytetramethylene oxides or derivatives thereof are known per se to those skilled in the art. Preferred polyetherols are according to the invention polyethylene glycols, polypropylene glycols, and polytetramethylene oxides, and also mixed polyetherols thereof.

In a further embodiment, the present invention accordingly relates to a block copolymer as described above, wherein block B and the polymer (PM) are selected from the group consisting of polyethers.

When a polymer (PM) is used, the mixing ratio of triblock copolymer and polymer (PM) may vary within wide ranges. The triblock copolymer is typically used in an amount within a range from 20% to 80% by weight based on the sum of the amount of triblock copolymer and of polymer (PM).

In a further embodiment, the present invention accordingly relates to a block copolymer as described above, wherein the triblock copolymer is used in an amount within a range from 20% to 80% by weight based on the sum of the amount of triblock copolymer and of polymer (PM).

In a further embodiment, the present invention relates to a block copolymer as described above, wherein the number-average molecular weight Mn of the polymer (PM), in particular of the polytetramethylene oxide, is within a range from 500 to 3500 g/mol, preferably within a range from 500 to 3000 g/mol.

Preference is given to using a polymer (PM) of similar molecular weight to the triblock copolymer ABA'.

In a further embodiment, the present invention accordingly relates to a block copolymer as described above, wherein the number-average molecular weight of the polymer (PM) is within a range from 80% to 120% of the number-average molecular weight of the triblock copolymer ABA', preferably within a range from 90% to 100%, more preferably within a range from 95% to 105%, particularly preferably approximately 100%.

Block (P2) is according to the invention selected from the group consisting of polyesters and polyamides. Polyamide for the purposes of the invention means homopolyamides and copolyamides, i.e. condensation products of lactams, amino acids or diacids with diamines, and in general any polymer formed by units linked to one another by amide groups.

In a further embodiment, the present invention accordingly relates to a block copolymer as described above, wherein block (P2) is a polyamide block obtained or obtainable by reaction of a selected from the group consisting of aliphatic, semiaromatic, and aromatic polyamides.

Suitable polyamides are known per se. The polyamide may in accordance with the invention also be a copolyamide. Suitable is for example a polyamide block containing at least one of the following molecules: 11-aminoundecanoic acid, 11-(n-heptylamino)undecanoic acid, succinic acid, azelaic acid, sebacic acid, dodecanedioic acid, myristic acid, tetradecanedioic acid, hexadecanedioic acid, octadecanedioic acid, butanediamine, pentanediamine, decamethylenediamine, fatty acid(s), fatty acid dimer(s), and mixtures thereof. The at least one polyamide block advantageously comprises at least one monomer selected from the following polyamide monomers: 11, 5.4, 5.9, 5.10, 5.12, 5.13, 5.14, 5.16, 5.18, 5.36, 6.4, 6.9, 6.10, 6.12, 6.13, 6.14, 6.16, 6.18, 6.36, 10.4, 10.9, 10.10, 10.12, 10.13, 10.14, 10.16, 10.18, 10,36, 10.T, 12.4, 12.9, 12.10, 12.12, 12.13, 12.14, 12.16, 12.18, 12.36, 12.T, and mixtures and copolymers thereof.

In accordance with the invention, block (P2) may in a further embodiment also be selected from polyesters.

Suitable polyesters are known per se to those skilled in the art. Suitable are for example aromatic, aliphatic or aliphatic-aromatic polyesters. Suitable aromatic polyesters are obtained for example by transesterification. In the context of the present invention, the polyester (PE-1) may preferably be obtained by transesterification. The term "transesterification" is in the context of the present invention understood as meaning that a polyester is reacted with a compound having two Zerewitinoff-active hydrogen atoms, for example a compound having two OH groups or two NH groups or a compound having one OH group and one NH group.

It is in accordance with the invention also possible that the polyester comprises a copolymer. The at least one polyester block advantageously comprises at least one of the following molecules: ethylene glycol, propane-1,3-diol, butane-1,4-diol, decane-1,10-diol, dimerized fatty acid reduced to obtain the corresponding diol, furan-2,5-dicarboxylic acid, succinic acid, azelaic acid, sebacic acid, dodecanedioic acid, myristic acid, tetradecanedioic acid, hexadecanedioic acid, octadecanedioic acid and/or dimerized fatty acids.

Polyester for the purposes of the invention means the products of the condensation of dicarboxylic acids with diols and in general any polymer, the macromolecular backbone of which contains repeat units containing the ester chemical function.

The polyester blocks are typically produced by a polycondensation between a dicarboxylic acid and a diol. Suitable carboxylic acids comprise those mentioned above that are used to form the polyamide blocks. Suitable diols comprise linear aliphatic diols such as ethylene glycol, 1,3-propylene glycol, 1,4-butylene glycol, 1,6-hexylene glycol, branched diols such as neopentyl glycol, 3-methylpentane glycol, 1,2-propylene glycol, and cyclic diols such as 1,4-bis(hydroxymethyl)cyclohexane, and 1,4-cyclohexanedimethanol.

Suitable are for example polyester blocks resulting from the reaction of at least one dicarboxylic acid with at least one chain-extending short diol unit. The polyester blocks and polyether blocks are typically linked by ester linkages resulting from the reaction of the acid functions of the dicarboxylic acid with the OH functions of the polyether diol. The chain-extending short diol may be selected from the group consisting of neopentyl glycol, cyclohexanedimethanol, and aliphatic glycols. The chain of polyethers and diacids forms flexible blocks, whereas the chain of glycol or butanediol with the diacids forms rigid blocks of the copolyetherester.

Examples of aromatic dicarboxylic acids are terephthalic acid, isophthalic acid, dibenzoic acid, naphthalenedicarboxylic acid, 4,4'-diphenylenedicarboxylic acid, bis(p-carboxyphenyl)methanoic acid, ethylenebis-p-benzoic acid 1 known 4-tetramethylenebis(p-oxybenzoic acid), ethylenebis(p-oxybenzoic acid), 1,3-trimethylenebis(p-oxybenzoic acid). Examples of glycols may be ethylene glycol, 1,3-trimethylene glycol, 1,4-tetramethylene glycol, 1,6-hexamethylene glycol, 1,3-propylene glycol, 1,8-octamethylene glycol, 1,10-decamethylene glycol, and 1,4-cyclohexylenedimethanol.

Polyesters suitable for use are also the polyalkylene terephthalates of alkanediols having 2 to 6 carbon atoms, in particular aromatic polyesters selected from the group consisting of polybutylene terephthalate (PBT), polyethylene terephthalate (PET), and polyethylene naphthalate (PEN), preference being given to using polyethylene terephthalate and particular preference to polybutylene terephthalate or mixtures of polyethylene terephthalate and polybutylene terephthalate.

In a further embodiment, the present invention accordingly relates to a block copolymer as described above, wherein block (P2) is a polyester block obtained or obtainable by reaction of a selected from the group consisting of polybutylene terephthalates and polyethylene terephthalates.

The block length of block (B2) may in accordance with the invention be varied within wide ranges.

The block copolymer has according to the invention for example a weight-average molecular weight Mw within a range from 5000 to 150,000 g/mol, preferably within a range from 10,000 to 120,000 g/mol, or else within a range from 30,000 to 100,000 g/mol.

In the context of the present invention, the weight-average molecular weights Mw of the thermoplastic block copolymers are unless otherwise stated determined by GPC as solutions in HFIP (hexafluoroisopropanol). The molecular weight is determined using two GPC columns arranged in series (PSS gel; 100 A; 5 µ; 300*8 mm, Jordi Gel DVB; mixed bed; 5 µ; 250*10 mm; column temperature 60° C.; flow 1 ml/min; RI detector). Calibration here is with polymethyl methacrylate (EasyCal; from PSS, Mainz), with HFIP used as eluent.

In a further aspect, the present invention also relates to a process for producing a block copolymer at least comprising a block (P1) obtained or obtainable by reaction of a triblock copolymer having the structure A-B-A', where block B is selected from polyethers or polyesters and blocks A and A' are identical or different, and at least one polymer (PM) selected from the group consisting of polyesters and polyethers, and a block (P2) selected from the group consisting of polyamides and polyesters, said process comprising the reaction of a composition comprising a triblock copolymer A-B-A' and a polymer (PM) selected from the group consisting of polyesters and polyethers.

With regard to preferred embodiments, reference is made to the above details relating to preferred starting materials and reaction conditions.

The process of the invention may comprise a plurality of steps, for example providing a mixture comprising the triblock copolymer and a polymer (PM) and reacting the triblock copolymer and the polymer (PM) with a suitable compound to form the block copolymer. For example, the block copolymer may be formed by coupling a polyamide block or polyester block with the triblock copolymer or with the polymer (PM) or it may be formed by taking a composition comprising the triblock copolymer and the polymer (PM) and forming the block (P2) by adding suitable monomers.

Different methods of production are in principle known in the prior art. For example, the polyamide blocks or polyester blocks can be polymerized onto an initial charge of triblock copolymer and polymer (PM), it being possible to modify the final functionality of the triblock copolymer for example by reaction of the hydroxyl function with maleic anhydride, via diisocyanates or other coupling reagents. Suitable processes are known per se, including for example transesterification or transamidation.

When the block copolymer has a polyamide as block (P2), construction can take place for example via polycondensation of polyamide blocks having reactive ends with polyether blocks having reactive ends, such as inter alia polyamide blocks having diamine chain ends with polyoxyalkylene blocks having dicarboxylic acid chain ends, polyamide blocks having dicarboxylic acid chain ends with polyoxyalkylene blocks having diamine chain ends obtained through cyanoethylation and hydrogenation of aliphatic dihydroxylated alpha-omega-polyoxyalkylene blocks, referred to as polyether diols, or polyamide blocks having dicarboxylic acid chain ends with polyether diols.

The polyamide blocks having dicarboxylic acid chain ends are for example obtainable from the condensation of polyamide precursors in the presence of a chain-limiting dicarboxylic acid. The polyamide blocks having diamine chain ends are obtained for example from the condensation of polyamide precursors in the presence of a chain-limiting diamine. The number-average molecular weight Mn of the polyamide blocks is within a range from 400 to 20,000 g/mol, preferably from 500 to 10,000 g/mol, and more preferably from 600 to 6,000 g/mol.

In accordance with the invention, the polyamide blocks are for example obtainable from the condensation of at least one dicarboxylic acid (aliphatic, cycloaliphatic or aromatic), in particular ones having 4 to 36 carbon atoms, preferably ones having 6 to 18 carbon atoms, and from at least one diamine (aliphatic, cycloaliphatic or aromatic) selected in particular from ones having 2 to 20 carbon atoms, preferably ones having 6 to 15 carbon atoms. Examples of aliphatic diacids are butanoic acid, adipic acid, suberic acid, azelaic acid, sebacic acid, dodecanedioic acid, myristic acid, tetradecanedicarboxylic acid, hexadecanedicarboxylic acid, octadecanedicarboxylic acid, and the dimerized fatty acids. Examples of cycloaliphatic diacids are 1,4-cyclohexyldicarboxylic acid. Examples of aromatic diacids are terephthalic acid (T) and isophthalic acid (I). Examples of aliphatic diamines are tetramethylenediamine, hexamethylenediamine, 1,10-decamethylenediamine, dodecamethylenediamine, trimethylhexamethylenediamine.

Examples of cycloaliphatic diamines are the isomers of bis(4-aminocyclohexyl)methane (BACM or PACM), bis(3-methyl-4-aminocyclohexyl)methane (BMACM or MACM) and 2,2-bis(3-methyl-4-aminocyclohexyl)propane (BMACP), isophoronediamine (IPDA), 2,6-bis(aminomethyl)norbornane (BAMN), and piperazine (Pip).

The copolymer of the invention advantageously contains at least one PA block based on PA 4.4, PA 4.6, PA 4.9, PA 4.10, PA 4.12, PA 4.14, PA 4.16, PA 4.18, PA 4.36, PA 6.4, PA 6.6, PA 6.9, PA 6.10, PA 6.12, PA 6.1.3, PA 6.1.4, PA 6.16, PA 6.18, PA 6.36, PA 9A, PA 9.6, PA 9.10, PA 9.12, PA 9.14, PA 9.18, PA 9.36, PA 10.4, PA 10.6, PA 10.9, PA 10.10, PA 10.12, PA 10.13, PA 10.14, PA 1.0.16, PA 10.18, PA 10.36, PA 10.T, PA BMACM.4, PA BMACM.6, PA BMACM.9, PA BMACM.10, PA BMACM.12, PA BMACM.14, PA BMACM.16, PA BMACM.18, PA BMACM.36, PA PACM.4, PA PACM.6, PA PACM.9, PA PACM.10, PA PACM.12, PA PACM.14, PA PACM.16, PA PACM.18, PA PACM.36, PA Pip.4, PA Pip.6, PA Pip.9, PA Pip.10, PA Pip.12, PA Pip.14, PA Pip.16, PA Pip.18 and/or PA Pip.36 and mixtures thereof.

In an alternative embodiment, the polyamide blocks are for example obtainable from the condensation of one or more alpha-omega-carboxylic acids and/or one or more lactams having 6 to 12 carbon atoms in the presence of a dicarboxylic acid having 4 to 12 carbon atoms or a diamine. Examples of lactams are caprolactam, enantholactam, and laurolactam. Examples of alpha-omega-aminocarboxylic acids are aminocaproic acid, 7-aminoheptanoic acid, 11-aminoundecanoic acid, and 12-aminododecanoic acid.

The polyamide blocks of the second type advantageously consist of polyamide 11, polyamide 12 or polyamide 6.

According to a third type, the polyamide blocks result from the condensation of at least one monomer of the first type with at least one monomer of the second type. In other words, the polyimide blocks result from the condensation of at least one alpha-omega-aminocarboxylic acid (or of a lactam) with at least one diamine and a dicarboxylic acid.

In this case, the PA blocks are produced by polycondensation: from aliphatic, cycloaliphatic or aromatic diamines having X carbon atoms; of dicarboxylic acid(s) having Y carbon atoms; and of comonomer(s) {Z} selected from lactams and alpha-omega-aminocarboxylic acids having Z carbon atoms; in the presence of a chain limiter selected from dicarboxylic acids or diamines or of an excess of diacid or diamine as structural unit.

It is advantageous to use as chain limiter a dicarboxylic acid having Y carbon atoms that is introduced in excess based on the stoichiometry of the diamine(s).

In a further embodiment, the polyamide blocks result from the condensation of at least two different alpha-omega-aminocarboxylic acids or of at least two different lactams having 6 to 12 carbon atoms or of a lactam and a nonidentical aminocarboxylic acid number of carbon atoms optionally in the presence of a chain limiter.

Examples of polyamide blocks of the third type are those formed by the following polyamides (copolyamides); PA 6/6.6, where 6 denotes caprolactam and 6.6 a monomer resulting from the condensation of hexamethylenediamine with adipic acid. PA 6.6/Pip.10/12, where 6.6 denotes a monomer resulting from the condensation of hexamethylenediamine with adipic acid. Pip.10 refers to a monomer resulting from the condensation of piperazine with sebacic acid. 12 refers to laurolactam. PA 6.6/6.10/11/12, where 6.6 denotes a monomer resulting from the condensation of hexamethylenediamine with adipic acid. 6.10 refers to a monomer resulting from the condensation of hexamethylenediamine with sebacic acid. 11 refers to 11-aminoundecanoic acid. 12 refers to laurolactam.

Other examples are PA 10.10/11, PA 6.10/11, PA 10.12/11, PA 10.10/11/12, PA 6.10/10.10/11, PA 6.10/6.12/11, PA 6.10/6.12/10.10.

In particular, the production of the block copolymers of the invention having a polyamide block and a triblock copolymer having a block B selected from polyethers encompasses all means for linking the polyamide blocks and triblock copolymers of the invention. In industry two processes are essentially employed: a two-stage process and a one-stage process.

In the one-step process, the polyamide precursors, the chain limiter, and the triblock copolymer are mixed together.

Polyamide blocks are thus also produced in a single-stage process. The simultaneous polycondensation of the blocks ABA' and the precursors of the polyamide blocks is preferably carried out at a temperature of 180 to 300° C. This affords a polymer having largely blocks of very variable length, but also having the various randomly reacted reactants statistically (randomly) distributed along the polymer chain.

It is also possible in accordance with the invention to use catalysts for the coupling reaction. Suitable catalysts or further auxiliaries and additives are known per se to those skilled in the art.

In the two-stage process, the polyamide blocks are produced first, followed, in a second step, by the attachment of the polyamide blocks and triblock copolymers. The triblock copolymers of the invention are either reacted as is in a copolycondensation with polyamide blocks having terminal carboxylic acids or they are aminated, converted into polyether diamines, and condensed with polyamide blocks having terminal carboxylic acids.

The conversion reaction to form the PA block is typically carried out between 180 and 300° C., preferably between 200 and 290° C., the pressure in the reactor is set between 5 and 30 bar and about 2 to 5 bar is maintained for 3 hours. The pressure is gradually lowered, with the reactor brought to atmospheric pressure, and the excess water is then distilled off, for example for one or two hours.

Suitable according to the invention are in particular polyamides that, firstly, crystallize well and/or are relatively hydrophobic, so that not only is water uptake from the hard phase of the final block copolymer reduced, but pronounced phase separation is also achieved, an example being PA 12.

When the block (P2) is a polyester block, the block copolymer of the invention may be formed for example by a coupling of suitable blocks, for example by transesterification, or the block (P2) may be formed by an esterification reaction. Suitable processes and reaction conditions are known per se to those skilled in the art.

In a further aspect, the present invention also relates to a block copolymer obtained or obtainable by a process of the invention.

The block copolymers obtained may be processed according to customary processes, for example in extruders, injection-molding machines, blow molds, calendars, kneaders, and presses.

Further auxiliaries or additives may in accordance with the invention be added to the block copolymer or the block copolymer of the invention may be processed in mixtures with other polymers.

In the case of compatibilizers or auxiliaries such as stabilizers, these may also already be incorporated into the components during the production thereof. The individual components are usually combined before the mixing process, or metered into the apparatus that performs the mixing. In the case of an extruder, the components are all metered into the intake and conveyed together into the extruder, or individual components are added via a side feed.

The processing takes place at a temperature at which the components are present in a plasticized state. The temperature depends on the softening/melting ranges of the components, but must be below the decomposition temperature of each component. Additives such as pigments or fillers or other customary auxiliaries mentioned above, for example flame retardants or antistatic auxiliaries, are not melted concomitantly, but are incorporated in the solid state.

Further embodiments in accordance with standard methods are possible here; the processes used in the production of the starting materials may be integrated directly into production. For instance, it would for example be possible in the case of the belt process, in which the material is fed into an extruder in order to obtain lenticular pellets, to introduce the polymer, the impact modifier, and also fillers, crosslinkers, flame retardants, other additives or dyes, directly at the end of the belt.

Some of the abovementioned customary auxiliaries may be added to the mixture in this step.

The good mechanical properties and good temperature behavior make the block copolymers of the invention suitable in particular for producing extruded, injection-molded and pressed articles and also foams, foam particles, shoe soles, ski shoes, ski films, cable sheaths, hoses, profiles, drive belts, fibers, nonwovens, films, moldings, plugs, housings, damping elements for the electricals industry, automotive industry, mechanical engineering, 3D printing, medicine, and consumer goods.

In a further aspect, the present invention also relates to the use of a block copolymer of the invention or of a block copolymer obtained or obtainable by a process of the invention for production of a shaped article. In a further aspect, the present invention also relates to the use of a block copolymer of the invention or of a block copolymer obtained or obtainable by a process of the invention for producing extruded, injection-molded and pressed articles and also foams, foam particles, shoe soles, cable sheaths, hoses, profiles, drive belts, fibers, nonwovens, films, moldings, plugs, housings, damping elements for the electricals industry, automotive industry, mechanical engineering, 3D printing, medicine, and consumer goods.

In a further aspect, the present invention also provides shaped articles comprising a block copolymer as described above or a block copolymer obtained or obtainable by a process of the invention.

The shaped article may in accordance with the invention be composed of a compact material. It is however also possible in the context of the present invention for the shaped article to be composed of an at least partly foamed material. The shaped article may in accordance with the invention be present for example in compact form or in the form of a particle foam, foamed molding, as obtained by injection molding, foamed semifinished product as obtained via an impregnation process in an autoclave or foam extrusion by means of a profile die, or else in the form of a slabstock foam. Processes for producing foamed materials, in particular foamed elastomers, are known per se. Suitable conditions are known per se to those skilled in the art.

In a further embodiment, the present invention accordingly also relates to the use of a block copolymer of the invention or of a block copolymer obtained or obtainable by a process of the invention for producing a shaped article, the shaped article being at least partly in the form of a foam or particle foam.

In the context of the present invention, it is also possible to first produce a pellet material comprising the block copolymer and then to produce a foamed pellet material. It is accordingly also possible for the shaped article to be present in the form of a foamed pellet material.

The block copolymer of the invention may also be used alone or as a mixture in which the copolymer makes up 5% to 100% by mass, preferably 5% to 70% by mass, preferably 5% to 30% by mass, of the total mass of the mixture.

The present invention accordingly additionally relates in a further aspect also to a foamed pellet material comprising a block copolymer obtainable or obtained by a process of the invention or a block copolymer of the invention.

The foamed pellets of the invention can be readily processed into shaped articles. More particularly, the foamed pellets have been found to have good weldability. In a further aspect, the present invention also relates to a shaped article made from a foamed pellet material as described above.

In accordance with the invention it is for example possible to first produce a pellet material comprising the block copolymer of the invention and then to produce from the pellet material a foamed pellet material. It is also possible to produce from the melt a slabstock foam or particle foam. Suitable processes are known per se to those skilled in the art and are described for example in WO 2007/082838 A1, WO2013/153190 A1, WO 2015/052265 A1 or WO 2015/055811 A1.

The present invention additionally relates to the use of a block copolymer obtainable or obtained by a process of the invention or of a block copolymer of the invention for production of a shaped article or of a foamed pellet material.

It has surprisingly been found that the shaped articles of the invention and foamed pellets are characterized by low component densities, good resiliences, and good cold flexibilities. The foamed pellets additionally have a low bulk density.

The foamed pellets can be produced by standard processes known in the prior art.

The foamed pellets of the invention generally have a bulk density of 20 g/l to 200 g/l, preferably 50 g/l to 180 g/l, more preferably 60 g/l to 150 g/l.

As stated above, the diameter of the foamed pellets is from 0.5 to 20 mm, preferably 1 to 15 mm, and in particular from 3 to 12 mm. In the case of non-spherical, for example elongate or cylindrical foamed pellets, diameter means the longest dimension.

In a further embodiment, the present invention accordingly relates to a foamed pellet material as described above, wherein the average diameter of the particles is within a range from 0.5 to 20 mm.

The unexpanded pellets here preferably have an average minimum diameter of 0.2-10 mm (determined via 3D evaluation of the pellet material, for example via dynamic image analysis using a PartAn 3D optical measuring apparatus from Microtrac).

The individual pellets generally have an average mass within a range from 0.1 to 100 mg, for example within arrange from 1 to 50 mg, preferably within a range from 4 to 40 mg, and more preferably within a range from 7 to 32 mg. This average mass of the pellets (particle weight) is determined as the arithmetic mean by triplicate weighing of in each case 10 particles of the pellet material.

The foamed pellets are used in particular for producing shaped articles from particle foams. In a further aspect, the present invention also relates to a shaped article made from a foamed pellet material as described above. Processes for producing such shaped articles are known per se.

In a further aspect, the present invention also relates to the use of a foamed pellet material of the invention or of a foamed pellet material obtained or obtainable by a process of the invention for production of shaped articles. In a further embodiment, the present invention accordingly also relates to the use of a foamed pellet material of the invention or of a foamed pellet material obtained or obtainable by a process of the invention for production of shaped articles, wherein the shaped article is produced by fusing or bonding of the particles to one another.

In a further aspect, the present invention also relates to the use of a foamed pellet material of the invention for producing a shaped article. The present invention further provides a shaped article produced from the foamed pellets of the invention.

A process for producing a shaped article from a foamed pellet material that is suitable in accordance with the invention comprises, for example, the following steps:
(A) introducing the foamed pellets of the invention into an appropriate mold;
(B) fusing the foamed pellets of the invention from step (i).

The fusing in step (B) is preferably effected in a closed mold, wherein the fusing can be effected by means of steam, hot air, hot pressing or high-energy radiation (microwaves or radio waves).

Suitable conditions are known per se to those skilled in the art. In the context of the present invention, the conditions are typically chosen such that the material softens sufficiently that it is able to form a stable bond, but not too much so that the cell structure does not collapse.

As stated above, the moldings of the invention have advantageous properties for the abovementioned uses in the shoe and sports shoe sector requirement.

Characteristic features of the tensile properties and compression properties of the shaped articles produced from the foamed pellets are that tensile strength is above 600 kPa (ASTM D 5035), elongation at break is above 100% (ASTM D 503), and compressive stress at 10% compression is above 15 kPa (in accordance with DIN EN ISO 844, November 2014; the departure from the standard is in the height of the specimen, 20 mm instead of 50 mm, and thus the adjustment of the testing speed to 2 mm/min).

The foamed pellets of the invention can be processed particularly readily into shoe soles, part of a shoe sole, mattresses, seat cushions, underlays, grips, protective films, components in automobile interiors and exteriors, gymnastics mats, body protectors, trim elements in automobile construction, sound insulators, vibration dampers, cushioning, bicycle saddles, in toys, tires or tire parts, or as covering for a track and field surface, a sports hall or a pathway, a damping layer or a damping core in a sandwich element, or a packaging.

In a further embodiment, the present invention accordingly also relates to the use of the block copolymers of the invention as described above, wherein the shaped article is a shoe sole, part of a shoe sole, a mattress, seat cushion, underlay, grip, protective film, a component in automobile interiors and exteriors, a gymnastics mat, a body protector, a trim element in automobile construction, a sound insulator, a vibration damper, cushioning, a bicycle saddle, a toy, a tire or part of a tire, or a covering for a track and field surface, a sports hall or a pathway, a damping layer or a damping core in a sandwich element, or a packaging.

In a further embodiment, the present invention accordingly also relates to the use of the block copolymers of the invention as described above, wherein the shaped article is an injection-molded, extruded and pressed article, a hose, a cable or part of a cable, an elevator belt or drive belt, a conveyor belt, a hose, part of a shoe, a film, a nonwoven, fibers, a ski shoe or part of a ski shoe, a ski film, a plug, a damping element, housing, a molding for the electricals industry, automotive industry, mechanical engineering, 3D printing, medicine, consumer goods, and sports articles.

In a further aspect, the present invention also relates to the use of a foamed pellet material as described above in balls and sports equipment or as floor covering and wall paneling, in particular for sports surfaces, track and field surfaces, sports halls, children's playgrounds, and pathways.

The shaped articles obtained in accordance with the invention are suitable, for example, for the production of shoe soles, parts of a shoe sole, bicycle saddles, cushioning, mattresses, underlays, grips, protective films, components in automobile interiors and exteriors, in balls and sports equipment or as floor covering and wall paneling, in particular for sports surfaces, track and field surfaces, sports halls, children's playgrounds, and pathways.

In a further embodiment, the present invention accordingly also relates to the use of a foamed pellet material of the invention or of a foamed pellet material obtained or obtainable by a process of the invention for production of shaped articles, wherein the shaped article is a shoe sole, part of a shoe sole, a bicycle saddle, cushioning, a mattress, underlay, grip, protective film, a component in automobile interiors and exteriors.

In a further aspect, the present invention also relates to the use of the foamed pellets or foamed particles of the invention in balls and sports equipment or as floor covering and wall paneling, in particular for sports surfaces, track and field surfaces, sports halls, children's playgrounds, and pathways.

In a further aspect, the present invention also relates to a hybrid material comprising a matrix composed of a polymer (MM) and a foamed pellet material according to the present invention. Materials that comprise a foamed pellet material and a matrix material are referred to as hybrid materials in the context of the present invention. The matrix material here may be composed of a compact material or likewise of a foam.

Polymers (MM) suitable as matrix material are known per se to those skilled in the art. Suitable in the context of the present invention are for example ethylene-vinyl acetate copolymers, epoxide-based binders or polyurethanes. Polyurethane foams or compact polyurethanes, for example thermoplastic polyurethanes, are suitable here in accordance with the invention.

The chosen polymer (MM) is according to the invention one that provides sufficient adhesion between the foamed pellets and the matrix such that a mechanically stable hybrid material is obtained.

The matrix may completely or partially surround the foamed pellet material. The hybrid material may in accordance with the invention comprise further components, for example further fillers or pellets. The hybrid material may in accordance with the invention also comprise mixtures of different polymers (MM). The hybrid material may also comprise mixtures of foamed pellets.

Foamed pellets that may be used in addition to the foamed pellet material of the present invention are known per se to those skilled in the art. Foamed pellets composed of thermoplastic polyurethanes are particularly suitable in the context of the present invention.

In one embodiment, the present invention accordingly also relates to a hybrid material comprising a matrix composed of a polymer (MM), a foamed pellet material according to the present invention, and a further foamed pellet material composed of a thermoplastic polyurethane.

The matrix consists in the context of the present invention of a polymer (MM). Examples of matrix materials suitable in the context of the present invention are elastomers or foams, in particular polyurethane-based foams, for example elastomers such as ethylene-vinyl acetate copolymers or thermoplastic polyurethanes.

The present invention accordingly also relates to a hybrid material as described above, wherein the polymer (MM) is an elastomer. The present invention additionally relates to a hybrid material as described above, wherein the polymer (MM) is selected from the group consisting of ethylene-vinyl acetate copolymers and thermoplastic polyurethanes.

In one embodiment, the present invention also relates to a hybrid material comprising a matrix composed of an ethylene-vinyl acetate copolymer and a foamed pellet material according to the present invention.

In a further embodiment, the present invention relates to a hybrid material comprising a matrix composed of an ethylene-vinyl acetate copolymer, a foamed pellet material according to the present invention, and a further foamed pellet material composed for example of a thermoplastic polyurethane.

In one embodiment, the present invention relates to a hybrid material comprising a matrix composed of a thermoplastic polyurethane and a foamed pellet material according to the present invention.

In a further embodiment, the present invention relates to a hybrid material comprising a matrix composed of a thermoplastic polyurethane, a foamed pellet material according to the present invention, and a further foamed pellet material composed for example of a thermoplastic polyurethane.

Suitable thermoplastic polyurethanes are known per se to those skilled in the art. Suitable thermoplastic polyurethanes are for example described in "Kunststoffhandbuch" [Plastics handbook], volume 7, "Polyurethane" [Polyurethanes], Carl Hanser Verlag, 3rd edition 1993, chapter 3.

The polymer (MM) is in the context of the present invention preferably a polyurethane. "Polyurethane" for the purposes of the invention encompasses all known resilient polyisocyanate polyaddition products. These include, in particular, solid polyisocyanate polyaddition products, such as viscoelastic gels or thermoplastic polyurethanes, and resilient foams based on polyisocyanate polyaddition products, such as flexible foams, semirigid foams or integral foams. For the purposes of the invention, "polyurethanes" are further understood as meaning resilient polymer blends comprising polyurethanes and further polymers, and also foams composed of these polymer blends. The matrix is preferably a hardened, compact polyurethane binder, a resilient polyurethane foam or a viscoelastic gel.

A "polyurethane binder" is in the context of the present invention understood as meaning a mixture that consists to an extent of at least 50% by weight, preferably to an extent of at least 80% by weight, and in particular to an extent of at least 95% by weight, of a prepolymer having isocyanate groups, referred to hereinafter as isocyanate prepolymer. The viscosity of the polyurethane binder of the invention is preferably within a range from 500 to 4000 mPa·s, more preferably from 1000 to 3000 mPa·s, measured at 25° C. in accordance with DIN 53 018.

In the context of the invention "polyurethane foams" are understood as meaning foams in accordance with DIN 7726.

The density of the matrix material is preferably within a range from 1.2 to 0.01 g/cm$^3$. The matrix material is particularly preferably a resilient foam or an integral foam having a density within a range from 0.8 to 0.1 g/cm$^3$, in particular from 0.6 to 0.3 g/cm$^3$, or a compact material, for example a hardened polyurethane binder.

Foams are particularly suitable as matrix materials. Hybrid materials comprising a matrix material composed of a polyurethane foam preferably have good adhesion between the matrix material and foamed pellet material.

In one embodiment, the present invention also relates to a hybrid material comprising a matrix composed of a polyurethane foam and a foamed pellet material according to the present invention.

In a further embodiment, the present invention relates to a hybrid material comprising a matrix composed of a polyurethane foam, a foamed pellet material according to the present invention, and a further foamed pellet material composed for example of a thermoplastic polyurethane.

In one embodiment, the present invention relates to a hybrid material comprising a matrix composed of a polyurethane integral foam and a foamed pellet material according to the present invention.

In a further embodiment, the present invention relates to a hybrid material comprising a matrix composed of a polyurethane integral foam, a foamed pellet material according to the present invention, and a further foamed pellet material composed for example of a thermoplastic polyurethane.

A hybrid material of the invention comprising a polymer (MM) as matrix and a foamed pellet material of the invention can for example be produced by mixing the components used to produce the polymer (MM) and the foamed pellet material optionally with further components and reacting them to give the hybrid material, the reaction preferably being carried out under conditions at which the foamed pellet material is essentially stable.

Suitable processes and reaction conditions for producing the polymer (MM), in particular an ethylene-vinyl acetate copolymer or a polyurethane, are known per se to those skilled in the art.

In a preferred embodiment, the inventive hybrid materials are integral foams, in particular integral foams based on polyurethanes. Suitable processes for producing integral foams are known per se to those skilled in the art. The integral foams are preferably produced by the one-shot process using the low-pressure or high-pressure technique in closed, advantageously temperature-controlled molds. The molds are usually made of metal, for example aluminum or steel. These procedures are described for example by Piechota and Röhr in "Integralschaumstoff" [Integral foam], Carl-Hanser-Verlag, Munich, Vienna, 1975, or in "Kunststoff-Handbuch" [Plastics handbook], volume 7, "Polyurethane" [Polyurethanes], 3rd edition, 1993, chapter 7.

When the hybrid material of the invention comprises an integral foam, the amount of the reaction mixture introduced into the mold is such that the resulting shaped articles composed of integral foams have a density of 0.08 to 0.70 $g/cm^3$, in particular of 0.12 to 0.60 $g/cm^3$. The densification levels for producing shaped articles having a compacted edge zone and cellular core are within arrange from 1.1 to 8.5, preferably from 2.1 to 7.0.

It is thus possible to produce hybrid materials having a matrix composed of a polymer (MM) and incorporating the foamed pellet material of the invention, in which there is a homogeneous distribution of the foamed particles. The foamed pellet material of the invention can be readily used in a process for producing a hybrid material since the individual particles are free-flowing on account of their small size and do not place any specific demands on processing. It is possible here to use techniques for homogeneously distributing the foamed pellet material, such as slow rotation of the mold.

Further auxiliaries and/or additives may optionally also be added to the reaction mixture for producing the hybrid materials of the invention. Examples include surface-active substances, foam stabilizers, cell regulators, release agents, fillers, dyes, pigments, hydrolysis stabilizers, odor-absorbing substances and fungistatic and bacteriostatic substances.

Surface-active substances that may be used are for example compounds used to promote homogenization of the starting materials and that optionally are also suitable for regulating the cell structure. Examples include emulsifiers, for example the sodium salts of castor oil sulfates or of fatty acids and also salts of fatty acids with amines, for example diethylamine oleate, diethanolamine stearate, diethanolamine ricinoleate, salts of sulfonic acids, for example alkali metal or ammonium salts of dodecylbenzene- or dinaphthylmethanedisulfonic acid and ricinoleic acid; foam stabilizers, for example siloxane-oxyalkylene copolymers and other organopolysiloxanes, ethoxylated alkylphenols, ethoxylated fatty alcohols, paraffin oils, castor oil esters or ricinoleic esters, Turkey red oil, and peanut oil, and cell regulators, for example paraffins, fatty alcohols, and dimethylpolysiloxanes. Oligomeric acrylates having polyoxyalkylene and fluoroalkane radicals as pendant groups are also suitable for improving the emulsifying action, cell structure and/or stabilization of the foam.

Examples of suitable release agents include: reaction products of fatty acid esters with polyisocyanates, salts of polysiloxanes and fatty acids containing amino groups, salts of saturated or unsaturated (cyclo)aliphatic carboxylic acids having at least 8 carbon atoms and tertiary amines, and also in particular internal release agents, such as carboxylic esters and/or carboxylic amides produced by esterification or amidation of a mixture of montanic acid and at least one aliphatic carboxylic acid having at least 10 carbon atoms with at least difunctional alkanolamines, polyols and/or polyamines having molecular weights of 60 to 400, mixtures of organic amines, metal salts of stearic acid and organic mono- and/or dicarboxylic acids or anhydrides thereof or mixtures of an imino compound, the metal salt of a carboxylic acid, and optionally a carboxylic acid.

Fillers, in particular reinforcing fillers, are understood as meaning the customary organic and inorganic fillers, reinforcers, weighting agents, agents for improving abrasion behavior in paints, coating compositions etc. that are known per se. Specific examples include: inorganic fillers such as siliceous minerals, for example phyllosilicates such as antigorite, bentonite, serpentine, hornblendes, amphiboles, chrysotile, talc; metal oxides such as kaolin, aluminum oxides, titanium oxides, zinc oxide, and iron oxides, metal salts such as chalk, barite, and inorganic pigments such as cadmium sulfide, zinc sulfide and also glass and the like. Preference is given to using kaolin (china clay), aluminum silicate, and coprecipitates of barium sulfate and aluminum silicate and also natural and synthetic fibrous minerals such as wollastonite, metal fibers and in particular glass fibers of varying length, which may optionally have been sized. Examples of useful organic fillers include: carbon black, melamine, rosin, cyclopentadienyl resins and graft polymers, and also cellulose fibers, polyimide fibers, polyacrylonitrile fibers, polyurethane fibers, polyester fibers based on aromatic and/or aliphatic dicarboxylic esters, and in particular carbon fibers.

The inorganic and organic fillers may be used individually or as mixtures.

In a hybrid material of the invention, the proportion by volume of the foamed pellet material is preferably 20 percent by volume or more, more preferably 50 percent by volume or more, preferably 80 percent by volume or more, and in particular 90 percent by volume or more, in each case based on the volume of the hybrid system of the invention.

The hybrid materials of the invention, in particular hybrid materials having a matrix composed of cellular polyurethane, are characterized by very good adhesion of the matrix material to the foamed pellet material of the invention. As a result, there is preferably no tearing of a hybrid material of the invention at the interface of the matrix material and foamed pellet material. This makes it possible to produce hybrid materials in which mechanical properties such as tear-propagation resistance and elasticity are improved compared to conventional polymer materials, especially conventional polyurethane materials, of the same density.

The elasticity of hybrid materials of the invention in the form of integral foams is preferably greater than 40% and more preferably greater than 50% in accordance with DIN 53512.

The inventive hybrid materials, in particular those based on integral foams, additionally exhibit high resiliences at low density. Particularly integral foams based on hybrid materials of the invention are therefore outstandingly suitable as materials for shoe soles. Light and comfortable soles having good durability properties are thereby obtained. Such materials are especially suitable as mid soles for sports shoes.

The hybrid materials of the invention having a cellular matrix are suitable for example as cushioning, for example in furniture, and mattresses.

A particular feature of hybrid materials having a matrix composed of a viscoelastic gel is increased viscoelasticity and improved elastic properties. These materials are thus likewise suitable as cushioning materials, for example for seats, especially saddles such as bicycle saddles or motorcycle saddles.

Hybrid materials having a compact matrix are suitable e.g. as floor coverings, in particular as covering for playgrounds, track and field surfaces, sports fields, and sports halls.

The properties of the hybrid materials of the invention may vary within wide ranges depending on the polymer (MM) used, and can be varied within wide limits in particular by varying the size, shape, and nature of the expanded pellet material or else by adding further additives, for example by also adding further non-foamed pellet materials such as plastics pellets, for example rubber pellets.

The hybrid materials of the invention have high durability and toughness, which is evidenced in particular by high tensile strength and elongation at break. In addition, hybrid materials of the invention have a low density.

Further embodiments of the present invention can be found in the description and the examples. It is understood that the features of the subject matter/processes/uses according to the invention recited above and elucidated below may be used not only in the combination specified in each case but also in other combinations without departing from the scope of the invention. Thus, for example, the combination of a preferred feature with a particularly preferred feature, or of a feature not characterized further with a particularly preferred feature etc., is also encompassed implicitly even if this combination is not mentioned explicitly. Illustrative embodiments of the present invention are detailed hereinbelow, but are not intended to limit the present invention. In particular, the present invention also encompasses those embodiments that result from the dependency references and hence combinations specified hereinbelow. More particularly, it is pointed out that, where a range of embodiments is mentioned, for example in connection with the expression "according to any of embodiments 1 to 4", the intention is that each of the embodiments within said range is explicitly disclosed. The phrase is considered by those skilled in the art to be synonymous with the phrase "according to any of embodiments 1, 2, 3, and 4". It is explicitly stated that the following embodiments are a structured part of the description relating to general and preferred aspects of the present invention.

1. A block copolymer at least comprising
   (i) a block (P1) obtained or obtainable by reacting
      (a) a triblock copolymer having the structure A-B-A', where block B is selected from polyethers or polyesters and blocks A and A' are identical or different, and
      (b) at least one polymer (PM) selected from the group consisting of polyesters and polyethers,
   (ii) and a block (P2) selected from the group consisting of polyamides and polyesters.

2. The block copolymer according to embodiment 1, wherein block B and the polymer (PM) are selected from the group consisting of polyethers.

3. The block copolymer according to either of embodiments 1 and 2, wherein the triblock copolymer is used in an amount within a range from 20% to 80% by weight based on the sum of the amount of triblock copolymer and of polymer (PM).

4. The block copolymer according to any of embodiments 1 to 3, wherein block B is selected from polyethers and the polymer (PM) is selected from polyethers.

5. The block copolymer according to any of embodiments 1 to 4, wherein block B is selected from polytetramethylene oxides and polytrimethylene oxides.

6. The block copolymer according to any of embodiments 1 to 3, wherein block B is selected from polyesters and the polymer (PM) is selected from polyesters.

7. The block copolymer according to any of embodiments 1 to 6, wherein block A, or block A', or block A and block A' are selected from polycaprolactones.

8. The block copolymer according to any of embodiments 1 to 7, wherein the triblock copolymer is a poly-ε-caprolactone polyol obtainable or obtained by reaction of ε-caprolactone and a starter molecule selected from the group consisting of α-hydro-ω-hydroxypoly(oxytetramethylene) diols.

9. The block copolymer according to embodiment 8, wherein the number-average molecular weight Mn of the polytetramethylene oxide is within a range from 500 to 3500 g/mol, preferably within a range from 500 to 3000 g/mol.

10. The block copolymer according to any of embodiments 1 to 8, wherein the number-average molecular weight Mn of the polymer (PM) is within a range from 500 to 3500 g/mol, preferably within a range from 500 to 3000 g/mol.

11. The block copolymer according to any of embodiments 1 to 10, wherein the number-average molecular weight of the polymer (PM) is within a range from 80% to 120% of the number-average molecular weight of the triblock copolymer ABA'.

12. The block copolymer according to any of embodiments 1 to 11, wherein block (P2) is a polyamide block obtained or obtainable by reaction of a selected from the group consisting of aliphatic, semiaromatic, and aromatic polyamides.

13. The block copolymer according to any of embodiments 1 to 11, wherein block (P2) is a polyester block obtained or obtainable by reaction of a selected from the group consisting of polybutylene terephthalates and polyethylene terephthalates.

14. A process for producing a block copolymer at least comprising a block (P1) obtained or obtainable by reaction of a triblock copolymer having the structure A-B-A', where block B is selected from polyethers or polyesters and blocks A and A' are identical or different, and at least one polymer (PM) selected from the group consisting of polyesters and polyethers, and a block (P2) selected from the group consisting of polyamides and polyesters, said process comprising the reaction of a composition comprising a triblock copolymer A-B-A' and a polymer (PM) selected from the group consisting of polyesters and polyethers.

15. A shaped article comprising a block copolymer according to any of embodiments 1 to 13 or a block copolymer obtained or obtainable by a process according to embodiment 14.

16. A foamed pellet material comprising a block copolymer according to any of embodiments 1 to 13 or a block copolymer obtained or obtainable by a process according to embodiment 14.

17. The foamed pellet material according to embodiment 16, wherein the average diameter of the particles is within a range from 0.5 to 20 mm.

18. A shaped article composed of a foamed pellet material according to either of embodiments 16 and 17.

19. The use of a block copolymer according to any of embodiments 1 to 13 for production of a shaped article.

20. The use according to embodiment 19, wherein the shaped article is at least partly in the form of a foam or particle foam.

21. The use according to embodiment 19 or 20, wherein the shaped article is a shoe sole, part of a shoe sole, a mattress, seat cushion, underlay, grip, protective film, a component in automobile interiors and exteriors, a gymnastics mat, a body protector, a trim element in automobile construction, a sound insulator, a vibration damper, cushioning, a bicycle saddle, a toy, a tire or part of a tire, or a covering for a track and field surface, a sports hall or a pathway, a damping layer or a damping core in a sandwich element, or a packaging.

22. The use according to embodiment 19 or 20, wherein the shaped article is an injection-molded, extruded and pressed article, a hose, a cable or part of a cable, an elevator belt or drive belt, a conveyor belt, a hose, part of a shoe, a film, a nonwoven, fibers, a ski shoe or part of a ski shoe, a ski film, a plug, a damping element, housing, a molding for the electricals industry, automotive industry, mechanical engineering, 3D printing, medicine, consumer goods, and sports articles.

23. A hybrid material comprising a matrix composed of a polymer (MM) and a foamed pellet material according to either of embodiments 16 and 17.

24. The hybrid material according to embodiment 23, wherein the polymer (MM) is an EVA.

25. The hybrid material according to embodiment 23, wherein the polymer (MM) is a thermoplastic polyurethane.

26. The hybrid material according to embodiment 23, wherein the polymer (MM) is a polyurethane foam.

27. The hybrid material according to embodiment 23, wherein the polymer (MM) is a polyurethane integral foam.

The examples that follow serve to illustrate the invention, but are in no way limiting in respect of the subject matter of the present invention.

EXAMPLES

1. Production of PCL500-PTHF1000-PCL500

The triblock PCL500-PCL1000-PCL500 was obtained by ring-opening polymerization of 100 percent by weight of caprolactone based on an initially charged hydroxy-terminated polytetramethylene oxide having a number-average molecular weight Mn of 1000 g/mol in the presence of 10 ppm of titanium tetrabutoxide (TTB) at 180° C.

2. Comparative Example 1: TPC Production via DMT and PTHF2000

Dimethyl terephthalate (100 mol %) was reacted in the presence of a threefold excess of butane-1,4-diol (300 mol %) and hydroxy-terminated polytetramethylene oxide having a number-average molecular weight Mn of 2000 g/mol (16.1 mol %) in a steel reactor in the presence of tetrabutyl orthotitanate as catalyst and 0.5% Irganox 1010 for 90 minutes at 165° C., standard pressure, and an atmosphere of nitrogen, while methanol was distilled off. The reaction temperature was then increased gradually to 210° C. After approx. 1 h the reaction temperature was increased to 250° C. and the excess butane-1,4-diol distilled off under reduced pressure (~20 Pa).

The synthesis was stopped as soon as a melt flow rate (MFR) of 5 cm³/10 min at 190° C./2.16 kg was achieved. Extrusion of the product afforded lenticular pellets.

3. Example 1: TPC Production Via MIT and PTHF2000/PCL500-PTHF1000-PCL500 (1:2)

Dimethyl terephthalate (100 mol %) was reacted in the presence of a threefold excess of butane-1,4-diol (300 mol %), hydroxy-terminated polytetramethylene oxide having a number-average molecular weight Mn of 2000 g/mol (5.4 mol %), and a hydroxy-terminated PCL500-PTHF1000-PCL500 having a number-average molecular weight Mn of 2.000 g/mol (10.7 mol %) in a steel reactor in the presence of tetrabutyl orthotitanate as catalyst and 0.5% Irganox 1010 for 90 minutes at 165° C., standard pressure, and an atmosphere of nitrogen, while methanol was distilled off. The reaction temperature was then increased gradually to 210° C. After approx. 1 h the reaction temperature was increased to 250° C. and the excess butane-1,4-diol distilled off under reduced pressure (~20 Pa).

The synthesis was stopped as soon as a melt flow rate (MFR) of 5 cm³/10 min at 190° C./2.16 kg was achieved. Extrusion of the product afforded lenticular pellets.

4. Comparative Example 2: TPC Production Via Terephthalic Acid and PTH52000

Terephthalic acid (100 mol %) was reacted in the presence of an excess of butane-1,4-diol (250 mol %) and hydroxy-terminated polytetramethylene oxide having a number-average molecular weight Mn of 2000 g/mol (16.1 mol %) in a steel reactor in the presence of tetrabutyl orthotitanate as catalyst and 0.5% Irganox 1010 for 90 minutes at 165° C., standard pressure, and an atmosphere of nitrogen, while methanol was distilled off. The reaction temperature was then increased gradually to 210° C. After approx. 1 h the reaction temperature was increased to 250° C. and the excess butane-1,4-diol distilled off under reduced pressure (~20 Pa).

The synthesis was stopped as soon as a melt flow rate (MFR) of 5 cm³/10 min at 190° C./2.16 kg was achieved. Extrusion of the product afforded lenticular pellets.

5. Example 2: TPC Production Via Terephthalic Acid and PTHF2000/PCL500-PTHF1000-PCL500 (1:2)

Terephthalic acid (100 mol %) was reacted in the presence of an excess of butane-1,4-diol (250 mol %), hydroxy-terminated polytetramethylene oxide having a number-average molecular weight Mn of 2000 g/mol (5.4 mol %), and a hydroxy-terminated PCL500-PTHF1000-PCL500 having a number-average molecular weight Mn of 2000 g/mol (10.7 mol %) in a steel reactor in the presence of tetrabutyl orthotitanate as catalyst and 0.5% Irganox 1010 for 90 minutes at 165° C., standard pressure, and an atmosphere of nitrogen, while methanol was distilled off. The reaction temperature was then increased gradually to 210° C. After approx. 1 h the reaction temperature was increased to 250° C. and the excess butane-1,4-diol distilled off under reduced pressure (~20 Pa).

The synthesis was stopped as soon as a melt flow rate (MFR) of 5 cm³/10 min at 190° C./2.16 kg was achieved. Extrusion of the product afforded lenticular pellets.

6. Comparative Example 3: TPA Production via PA6 and PTHF2000

ε-Caprolactam (100 mol %), terephthalic acid (6.3 mol %), and deionized water (27.8 mol %) were stirred in a steel reactor for 2 h at 260° C. and 3 bar pressure. The pressure was then gradually lowered to 5000 Pa and stirring continued for a further 2 h.

After a further 2 h, hydroxy-terminated polytetramethylene oxide having, a number-average molecular weight Mn of 2000 g/mol (3.15 mol %), propane-1,3-diol (4.8 mol %), and tetraisopropyl orthotitanate as catalyst were added to the reaction mixture and this was stirred for 1 h at 240° C. and 2 bar pressure. Excess propane-1,3-diol was then distilled off over a period of 1 h by lowering the pressure to ~20 Pa and raising the temperature to 250° C.

7. Example 3: TPA Production via PA6 & PTHF2000/PCL500-PTHF1000-PCL500

ε-Caprolactam (100 mol %), terephthalic acid (6.3 mol %), and deionized water (27.8 mol %) were stirred in a steel reactor for 2 h at 260° C. and 3 bar pressure. The pressure was then gradually lowered to 5000 Pa and stirring continued for a further 2 h.

After a further 2 h, hydroxy-terminated polytetramethylene oxide having a number-average molecular weight Mn of 2000 g/mol (1.1 mol %), hydroxy-terminated PCL500-PTHF1000-PCL500 having a number-average molecular weight Mn of 2000 g/mol (2.05 mol %), propane-1,3-diol (4.8 mol %), and tetraisopropyl orthotitanate as catalyst were added to the reaction mixture and this was stirred for 1 h at 240° C. and 2 bar pressure. Excess propane-1,3-diol was then distilled off over a period of 1 h by lowering the pressure to ~20 Pa and raising the temperature to 250° C.

8. Comparative Example 4: TPA Production Via PA12 with PTHF2000

Laurolactam (100 mol %) and decanedicarboxylic acid (26 mol %) were heated in a steel reactor to 280° C. under nitrogen for 2 h. To this was then added hydroxy-terminated polytetramethylene oxide having a number-average molecular weight Mn of 2000 g/mol (26.5 mol %), After stirring at 280° C. for 1 h, the temperature was lowered to 270° C. and stirring continued for a further 5 hours under a nitrogen atmosphere and a further 8 h under a vacuum of 90 mbar.

The synthesis was stopped as soon as a melt flow rate (MFR) of 12 g/10 min at 235° C./1.00 kg was achieved. Extrusion of the product afforded lenticular pellets.

9. Example 4: TPA Production via PA12 & PTHF2000/PCL500-PTHF1000-PCL500

Laurolactam (100 mol %) and decanedicarboxylic acid (26 mol %) were heated in a steel reactor to 280° C. under nitrogen for 2 h. To this were then added hydroxy-terminated polytetramethylene oxide having a number-average molecular weight Mn of 2000 g/mol (8.83 mol %) and a hydroxy-terminated PCL500-PTHF1000-PCL500 having a number-average molecular weight Mn of 2000 g/mol (17.7 mol %). After stirring at 280° C. for 1 h, the temperature was lowered to 270° C. and stirring continued for a further 5 hours under a nitrogen atmosphere and a further 8 h under a vacuum of 90 mbar.

The synthesis was stopped as soon as a melt flow rate (MFR) of 12 g/10 min at 235° C./1.00 kg was achieved. Extrusion of the product afforded lenticular pellets.

10. DSC Analysis

Injection molding was used to produce injection-molded sheets having a thickness of 2 mm, which were then subjected to heat treatment at 100° C. for 20 h. After the test specimen had been dried at 100° C. for 10 min, the first heating run of a DSC measurement was then measured from −60 to 240° C. at a heating rate of 20° C./min.

| TPE | Maximum of an endothermic peak in the range −20° C. to +20° C. |
|---|---|
| Comparative example 1 | Yes |
| Example 1 | No |
| Comparative example 2 | Yes |
| Example 2 | No |
| Comparative example 3 | Yes |
| Example 3 | No |
| Comparative example 4 | Yes |
| Example 4 | No |

11. Production of a Particle Foam from Example 1

Expanded particles composed of the TPC produced in example 1 were produced using a twin-screw extruder having a screw diameter of 18 mm and a length-to-diameter ratio of 40 connected to a melt pump, a start-up valve with screen changer, a die plate, and an underwater pelletization system. The TPC produced in example 1 was prior to use dried for 3 h at 80° C. so as to obtain a residual moisture content of less than 0.02% by weight.

The TPC was mixed with 0.1% by weight of talc (Microtalk IT Extra, Mondo Minerals), based on the TPC, and then metered into the twin-screw extruder gravimetrically.

After metering the materials into the intake of the twin-screw extruder, the molten TPC was mixed with the talc in the twin-screw extruder. After mixing, a mixture of $CO_2$ and $N_2$ was added as blowing agent. While passing along the rest of the extruder length, the blowing agent and the polymer melt were mixed with one another, resulting in the formation of a homogeneous mixture. The total throughput of the extruder, comprising the TPC, the talc, and the blowing agents, was 1.75 kg/h.

The melt mixture was then forced using a gear pump (GP) via a start-up valve with screen changer (SV) into a die plate (DP), cut into pellets in the cutting chamber of the underwater pelletization system (UWP), and transported away with the temperature-controlled and pressurized water and undergoing expansion in the process. A centrifugal dryer is used to ensure separation of the expanded particles from the process water.

The employed temperatures of the equipment components are listed in Table 2. Table 3 shows the amounts of blowing agent ($CO_2$ and $N_2$) used. The amounts stated for the blowing agents are based on the total throughput of polymer.

TABLE 2

Temperature data of the equipment components

| | Temperature range in the extruder (° C.) | Temperature range of the GP (° C.) | Temperature range of the SV (° C.) | Temperature range of the DP (° C.) | Water pressure in the UWP (bar) | Water temperature in the UWP (° C.) |
|---|---|---|---|---|---|---|
| V1 | 215-190 | 190 | 200 | 200 | 15 | 40 |
| V2 | 195-170 | 190 | 200 | 200 | 15 | 40 |
| V3 | 195-170 | 190 | 200 | 200 | 15 | 40 |
| V4 | 195-170 | 190 | 200 | 200 | 15 | 40 |
| V5 | 195-170 | 190 | 200 | 200 | 15 | 40 |
| V6 | 195-170 | 190 | 200 | 200 | 12.5 | 40 |
| V7 | 195-170 | 190 | 200 | 200 | 10 | 40 |
| V8 | 195-170 | 190 | 200 | 200 | 15 | 45 |
| V9 | 215-190 | 190 | 200 | 200 | 15 | 45 |
| V10 | 215-190 | 190 | 200 | 200 | 15 | 45 |

TABLE 3

Amounts of blowing agents added, based on total throughput of TPC from example 1

| | $CO_2$ [% by wt.] | $N_2$ [% by wt.] |
|---|---|---|
| V1 | 1.75 | 0.3 |
| V2 | 1.75 | 0.3 |
| V3 | 2 | 0.3 |
| V4 | 2.25 | 0.3 |
| V5 | 2.5 | 0.3 |
| V6 | 2.5 | 0.3 |
| V7 | 2.5 | 0.3 |
| V8 | 2.5 | 0.3 |
| V9 | 2.5 | 0.3 |
| V10 | 2.5 | 0.45 |

The resulting bulk densities of the expanded pellets for the individual experiments are listed in Table 4.

TABLE 4

Measured bulk density of the expanded particles after a storage period of at least 3 h

| | Bulk density (g/l) |
|---|---|
| V1 | 134 |
| V2 | 118 |
| V3 | 133 |
| V4 | 159 |
| V5 | 166 |
| V6 | 172 |
| V7 | 182 |
| V8 | 190 |
| V9 | 192 |
| V10 | 165 |

In addition to processing in the extruder, expanded particles were also produced in the impregnation vessel. For this, the vessel was filled with the solid/liquid phase to a fill level of 80%, the phase ratio being 0.32.

The solid phase is here the TPC from example 1 and the liquid phase is the mixture of water with calcium carbonate and a surface-active substance. After first purging with nitrogen, this mixture in the gas-tight vessel was pressurized with blowing agent (butane) in the amount stated in Table 5, based on the solid phase (TPC from example 1). The vessel was heated while stirring the solid/liquid phase, and at a temperature of 50° C. the mixture was pressurized with a defined amount of nitrogen to a pressure of 8 bar. The mixture was then further heated up to the desired impregnation temperature (IMT). On reaching the impregnation temperature and impregnation pressure, the pressure in the vessel was released via a valve after a specified hold time. The precise production parameters for the experiments and the bulk densities achieved are listed in Table 5.

TABLE 5

Production parameters and bulk density achieved for the impregnated TPC from example 1

| Name | Blowing agent concentration based on amount of solid phase (% by wt.) | Hold time (range IMT −5° C to IMT +2° C.) (min) | IMT (° C.) | Bulk density (g/l) |
|---|---|---|---|---|
| V11 | 24 | 15 | 129.5 | 185 |
| V12 | 24 | 8 | 130 | 168 |
| V13 | 24 | 10 | 132 | 113 |
| V14 | 24 | 14 | 134 | 104 |

12. Production of a Particle Foam from Example 4

Expanded particles composed of the TPA produced in example 4 were produced using a twin-screw extruder having a screw diameter of 18 mm and a length-to-diameter ratio of 40 connected to a melt pump, a start-up valve with screen changer, a die plate, and an underwater pelletization system. The IPA produced in example 4 was prior to use dried for 3 h at 80° C. so as to obtain a residual moisture content of less than 0.02% by weight.

The TPA was mixed with 0.1% by weight of talc (Microtalk IT Extra, Mondo Minerals), based on the TPA, and then metered into the twin-screw extruder gravimetrically.

After metering the materials into the intake of the twin-screw extruder, the molten TPA was mixed with the talc in the twin-screw extruder. After mixing, a mixture of $CO_2$ and $N_2$ was added as blowing agent. While passing along the rest of the extruder length, the blowing agent and the polymer melt were mixed with one another, resulting in the formation of a homogeneous mixture. The total throughput of the extruder comprising the TPA, the talc, and the blowing agents was 1.75 kg/h.

The melt mixture was then forced using a gear pump (GP) via a start-up valve with screen changer (SV) into a die plate (DP), cut into pellets in the cutting chamber of the underwater pelletization system (UWP), and transported away with the temperature-controlled and pressurized water and undergoing expansion in the process. A centrifugal dryer is used to ensure separation of the expanded particles from the process water.

The employed temperatures of the equipment components are listed in Table 6. Table 7 shows the amounts of blowing agent ($CO_2$ and $N_2$) used. The amounts stated for the blowing agents are based on the total throughput of polymer.

TABLE 6

Temperature data of the equipment components

| | Temperature range in the extruder (° C.) | Temperature range of the GP (° C.) | Temperature range of the SV (° C.) | Temperature range of the DP (° C.) | Water pressure in the UWP (bar) | Water temperature in the UWP (° C.) |
|---|---|---|---|---|---|---|
| V15 | 215-190 | 190 | 200 | 200 | 15 | 40 |
| V16 | 195-170 | 190 | 200 | 200 | 15 | 40 |

TABLE 7

Amounts of blowing agents added, based on total throughput of TPA from example 4

| | $CO_2$ [% by wt.] | $N_2$ [% by wt.] |
|---|---|---|
| V15 | 1.75 | 0.3 |
| V16 | 1.75 | 0.3 |

The resulting bulk densities of the expanded pellets for the individual experiments are listed in Table 8.

TABLE 8

Measured bulk density of the expanded particles after a storage period of at least 3 h

| | Bulk density (g/l) |
|---|---|
| V15 | 134 |
| V16 | 118 |

In addition to processing in the extruder, expanded particles were also produced in the impregnation vessel. For this, the vessel was filled with the solid/liquid phase to a fill level of 80%, the phase ratio being 0.32.

The solid phase is here the TPA from example 4 and the liquid phase is the mixture of water with calcium carbonate and a surface-active substance. After first purging with nitrogen, this mixture in the gas-tight vessel was pressurized with blowing agent (butane) in the amount stated in Table 9, based on the solid phase (TPA from example 4). The vessel was heated while stirring the solid/liquid phase, and at a temperature of 50° C. the mixture was pressurized with a defined amount of nitrogen to a pressure of 8 bar. The mixture was then further heated up to the desired impregnation temperature (IMT). On reaching the impregnation temperature and impregnation pressure, the pressure in the vessel was released via a valve after a specified hold time. The precise production parameters for the experiments and the bulk densities achieved are listed in Table 9.

TABLE 9

Production parameters and bulk density achieved for the impregnated TPA from example 4

| Name | Blowing agent concentration based on amount of solid phase (% by wt.) | Hold time (range IMT −5° C. to IMT +2° C.) (min) | IMT (° C.) | Bulk density (g/l) |
|---|---|---|---|---|
| V17 | 24 | 11 | 102.5 | 192 |
| V18 | 24 | 15 | 103.5 | 151 |
| V19 | 24 | 22 | 105 | 113 |

TABLE 9-continued

Production parameters and bulk density achieved for the impregnated TPA from example 4

| Name | Blowing agent concentration based on amount of solid phase (% by wt.) | Hold time (range IMT −5° C. to IMT +2° C.) (min) | IMT (° C.) | Bulk density (g/l) |
|---|---|---|---|---|
| V20 | 24 | 12 | 107 | 89 |
| V21 | 24 | 17 | 109 | 87 |

LITERATURE CITED

Jiri George Drobny, Handbook of Thermoplastic Elastomers, PDL Handbook Series, Elsevier, 2007, Geoffrey Holden, Hans R. Kricheldorf, Roderic P. Quirk, Thermoplastic Elastomers, Hanser Verlag, 2004, Chunwang Yi, Zhihan Peng, Huaping Wang, Min Li, Chaosheng Wang, Synthesis and characteristics of thermoplastic elastomer based on polyamide-6, 2011, 60, 12, 1728-1736

DE2936976
DE2936977
DE3818209A1
US2011213076
U.S. Pat. No. 8,481,652
U.S. Pat. No. 4,355,155A
U.S. Pat. No. 3,766,146A
U.S. Pat. No. 3,891,604A
U.S. Pat. No. 6,274,696B1
U.S. Pat. No. 7,973,124B2
EP0659825A2
U.S. Pat. No. 9,150,724B2
WO2001004174A1
U.S. Pat. No. 3,663,653A
EP2325249A1
U.S. Pat. No. 5,955,565A
"Kunststoffhandbuch" [Plastics handbook], volume 7, "Polyurethane" [Polyurethanes], Carl Hanser Verlag, 3rd edition, 1993, chapter 3.1

WO 2007/082838 A1
WO 2013/153190 A1
WO 2015/052265 A1
WO 2015/055811 A1
"Kunststoffhandbuch" [Plastics handbook], volume 7, "Polyurethane" [Polyurethanes], Carl Hanser Verlag, 3rd edition, 1993, chapter 3
Piechota and Röhr in "Integralschaumstoff" [Integral foam], Carl-Hanser-Verlag, Munich, Vienna, 1.975
"Kunststoff-Handbuch" [Plastics handbook], volume 7, "Polyurethane" [Polyurethanes], 3rd edition, 1993, chapter 7

The invention claimed is:

1. A block copolymer, comprising at least:
   a block (P1) obtained or obtainable by reacting
      a triblock copolymer having a structure A-B-A', where block B is selected from the group consisting of polyethers and polyesters, and block A and block A' are identical or different,
      wherein block A, or block A', or block A and block A' are selected from the group consisting of polycaprolactones, and
      at least one polymer (PM) selected from the group consisting of polyesters and polyethers, and
   a block (P2) selected from the group consisting of polyamides and polyesters.

2. The block copolymer as claimed in claim 1, wherein block B and the at least one polymer (PM) are selected from the group consisting of polyethers.

3. The block copolymer as claimed in claim 1, wherein the triblock copolymer is used in an amount within a range from 20% to 80% by weight based on a sum of the amount of the triblock copolymer and of the at least one polymer (PM).

4. The block copolymer as claimed in claim 1, wherein block B is selected from the group consisting of polyethers and the at least one polymer (PM) is selected from the group consisting of polyethers.

5. The block copolymer as claimed in claim 1, wherein block B is selected from the group consisting of polytetramethylene oxides and polytrimethylene oxides.

6. The block copolymer as claimed in claim 5, wherein a number-average molecular weight Mn of a polytetramethylene oxide is within a range from 500 to 3500 g/mol.

7. The block copolymer as claimed in claim 1, wherein block B is selected from the group consisting of polyesters and the at least one polymer (PM) is selected from the group consisting of polyesters.

8. The block copolymer as claimed in claim 1, wherein the triblock copolymer is a poly-ε-caprolactone polyol obtainable or obtained by reaction of ε-caprolactone and a starter molecule selected from the group consisting of α-hydro-ω-hydroxypoly(oxytetramethylene)diols.

9. The block copolymer as claimed in claim 1, wherein a number-average molecular weight Mn of the at least one polymer (PM) is within a range from 500 to 3500 g/mol.

10. The block copolymer as claimed in claim 1, wherein a number-average molecular weight of the at least one polymer (PM) is within a range from 80% to 120% of a number-average molecular weight of the triblock copolymer.

11. The block copolymer as claimed in claim 1, wherein block (P2) is a polyamide block obtained or obtainable by reaction of one selected from the group consisting of aliphatic, semiaromatic, and aromatic polyamides.

12. The block copolymer as claimed in claim 1, wherein block (P2) is a polyester block obtained or obtainable by reaction of one selected from the group consisting of polybutylene terephthalates and polyethylene terephthalates.

13. A process for producing a block copolymer comprising blocks (P1) and (P2), the process comprising:
    reacting a composition comprising a triblock copolymer A-B-A' and at least one polymer (PM) selected from the group consisting of polyesters and polyethers, to obtain a block copolymer (P1),
    where block B is selected from the group consisting of polyethers and polyesters and block A and block A' are identical or different;
    reacting block copolymer (P1) with a polymer selected from the group consisting of polyamides and polyesters to obtain the block copolymer comprising blocks (P1) and (P2).

14. A shaped article, comprising the block copolymer as claimed in claim 1.

15. A foamed pellet material, comprising the block copolymer as claimed in claim 1.

16. The foamed pellet material as claimed in claim 15, wherein an average diameter of particles is within a range from 0.5 to 20 mm.

17. A shaped article, composed of the foamed pellet material as claimed in claim 15.

18. A method, comprising:
    molding the block copolymer as claimed in claim 1, to produce a shaped article.

19. The shaped article as claimed in claim 14, wherein the shaped article is at least partly in a form of a foam or particle foam.

20. The shaped article as claimed in claim 14, wherein the shaped article is a part of a shoe sole, a mattress, a seat cushion, an underlay, a grip, a protective film, a component in automobile interiors and exteriors, a gymnastics mat, a body protector, a trim element in automobile construction, a sound insulator, a vibration damper, a cushioning, a bicycle saddle, a toy, a tire or part of a tire, a covering for a track and field surface, a sports hall or a pathway, a damping layer or a damping core in a sandwich element, or a packaging.

21. The shaped article as claimed in claim 14, wherein the shaped article is an injection-molded, extruded and pressed article, a hose, a cable or part of a cable, an elevator belt or drive belt, a conveyor belt, a hose, part of a shoe, a film, a nonwoven, a fiber, a ski shoe or part of a ski shoe, a ski film, a plug, a damping element, a housing, or a molding for the electricals industry, automotive industry, mechanical engineering, 3D printing, medicine, consumer goods, or sports articles.

* * * * *